UNITED STATES PATENT OFFICE.

CHARLES B. DUDLEY, OF ALTOONA, PENNSYLVANIA.

METHOD OF MAKING SODA-LIME.

SPECIFICATION forming part of Letters Patent No. 272,127, dated February 13, 1883.

Application filed October 28, 1882. (No specimens)

*To all whom it may concern:*

Be it known that I, CHARLES B. DUDLEY, of Altoona, county of Blair, and State of Pennsylvania, have invented new and useful Improvements in Methods of Making Soda-Lime; and I do hereby declare that the following is a full and exact description of the same.

This invention or discovery relates to the manufacture of soda-lime upon a large scale, for use in the art of purifying waters; and it consists in mixing sal-soda with caustic lime, without the application of extraneous heat, in such proportions and in such manner that the water chemically combined with the sal-soda will cause the slaking of the lime, and thus reduce the latter, in connection with the former, to a fine powder.

To enable others skilled in the art to use my improved method, I will proceed to fully describe the same.

Take the ordinary sal-soda in its crystalline form, as it is found in commerce, and ordinary caustic lime in its lumpy form, as it is found in commerce, in proper portions, as hereinafter described, and bring them into contact with each other in any suitable manner without the use of extraneous heat. If desired, the materials in their normal condition may be deposited upon a suitable floor and simply shoveled together. They may also, if desired, be mixed and crushed by passing them together through between proper crushing-rollers or other proper crushing mechanism in the manner well understood. When the materials named are brought into contact with each other the water chemically combined with the sal-soda is taken up by the lime, and the latter consequently is slaked thereby and reduced from a lumpy condition to that of a fine powder. The sal-soda also being freed from the water and being acted upon by the heat resulting from the slaking of the lime is reduced to a powdered condition.

The proportions of sal-soda and caustic lime may be varied between certain limits, according to the ratio between the carbonic acid, both free and as bicarbonates, and the sulphuric acid and chlorine in the waters in which it is desired to use the powder—that is, it will be necessary in all cases to have sufficient soda in the mixture to combine with the sulphuric acid and chlorine and sufficient lime to combine with the carbonic acid, both free and as bicarbonates.

In proportioning the ingredients, if the amount of crystalline water in the soda used in any case is more than sufficient to slake the lime, it may be necessary to subsequently apply heat to dry the powder. If the water in the soda is not sufficient to slaken the lime an additional supply of water may be employed. After the reaction has taken place the mass may be sifted for the double purpose of removing the lumps of unburned lime and intermixing more thoroughly the two ingredients.

The ordinary caustic lime of commerce it is well known has mixed with it, as an impurity, more or less of magnesia; but the presence of this, while not desired, makes no material difference in the value of the product.

I am aware that soda-lime has been manufactured from sal-soda and caustic lime; but an essential step in the described method is the application of extraneous heat to start the reaction.

Having thus fully described my discovery, what I claim as new, and desire to secure by Letters Patent, is—

The herein-described method of making soda-lime, consisting in mixing sal-soda with caustic lime, without the application of extraneous heat, in such proportions and in such manner that the water chemically combined with the sal-soda will be taken up by the caustic lime and produce a powdered product, as set forth.

This specification signed and witnessed this 25th day of October, 1882.

CHAS. B. DUDLEY.

Witnesses:
FRANK M. GREEN,
H. W. BEADLE.